United States Patent [19]

Stein et al.

[11] Patent Number: 5,034,455

[45] Date of Patent: Jul. 23, 1991

[54] CURABLE SILICONE CAULK COMPOSITIONS

[75] Inventors: Judith Stein, Schenectady, N.Y.; Tracey M. Leonard, Essex Junction, Vt.

[73] Assignee: General Electric Company, Schenectady, N.Y.

[21] Appl. No.: 416,340

[22] Filed: Oct. 3, 1989

Related U.S. Application Data

[63] Continuation-in-part of Ser. No. 200,482, May 3, 1988, abandoned.

[51] Int. Cl.$^5$ ............................................... C08K 3/26
[52] U.S. Cl. ................................. 524/788; 524/837; 524/863; 528/18; 528/34
[58] Field of Search ............... 524/788, 863, 837, 588; 528/18, 34

[56] References Cited

U.S. PATENT DOCUMENTS

| | | | |
|---|---|---|---|
| 2,891,920 | 6/1959 | Hyde | 524/714 |
| 3,294,725 | 12/1966 | Findlay | 524/745 |
| 3,355,406 | 11/1967 | Cekada | 524/263 |
| 3,664,997 | 5/1972 | Chadha et al. | 528/18 |
| 4,100,124 | 7/1978 | Ichikawa et al. | 524/730 |
| 4,221,688 | 9/1980 | Johnson et al. | 524/251 |
| 4,277,382 | 7/1981 | Lin et al. | 524/588 |
| 4,587,288 | 6/1986 | Maxson et al. | 524/425 |
| 4,618,642 | 10/1986 | Schoenherr | 524/425 |
| 4,877,828 | 10/1989 | Stein et al. | 524/728 |

*Primary Examiner*—John C. Bleutge
*Assistant Examiner*—R. Dean, Jr.
*Attorney, Agent, or Firm*—William A. Teoli; James C. Davis, Jr.; William H. Pittman

[57] ABSTRACT

Curable silicone caulk compositions are provided using a nonionically stabilized silanol-terminated polydiorganosiloxane, water, a silane cross-linker, a tin condensation catalyst, and calcium carbonate.

4 Claims, No Drawings

CURABLE SILICONE CAULK COMPOSITIONS

REFERENCE TO RELATED APPLICATION

This application is a continuation in part of copending application Ser. No. 200,482, filed May 3, 1988, now abandoned.

BACKGROUND OF THE INVENTION

Prior to the present invention, curable silicone emulsions providing an elastomer upon water removal were shown by J.F. Hyde et al., U.S. Pat. No. 2,891,920. It was found that the compositions of Hyde et al. required either a strong acid or a strong base to achieve stability of the emulsion. As a result, Hyde et al.'s silicone emulsions were limited in use due to their adverse effects on various substrates. Improved results are shown by D. E. Findlay et al., U.S. Pat. No. 3,294,725, employing a surface active sulfonic acid catalyst to achieve a stable emulsion and allow for the copolymerization of organosiloxanes and silacarbanes. An additional procedure for making silicon rubber latexes is shown by J. Cekada, Jr., U.S. Pat. No. 3,355,406, utilizing silsesquioxanes to reinforce the polymer.

The present invention is based on the discovery that stable aqueous curable silicone latex compositions can be made by initially emulsifying silanol-terminated polydiorganosiloxane in the presence of a nonionic surfactant, such as an alkylaryloxypoly(ethyleneoxy)ethanol followed by a pH adjustment up to 5 with a carboxylic acid, such as succinic acid. Also used in the emulsion are alkyltrialkoxysilane, for example methyltrimethoxysilane and a tin catalyst, such as a stannoxane, hydroxystannoxane, or a monomethoxy tin compound. Among the preferred tin compounds are stannoxanes of the formula, $$(R)_2SNX\text{-}O\text{-}Sn(R^1)_2OH, \qquad (1)$$

where R and $R^1$ are selected from the same or different $C_{(1-8)}$ alkyl radicals, and preferably butyl, and X is a halogen radical, or an acyloxy radical, and is preferably chloro.

In addition, calcium carbonate is utilized in the resulting curable silicone composition. The resulting silicone caulk has been found to have superior shelf life, such as six months or more, and elastomers resulting from the removal of water from such caulking compounds have been found to have excellent physical properties.

STATEMENT OF THE INVENTION

There is provided by the present invention, a silicone caulking composition comprising by weight,
(A) 100 parts of a base formulation consisting essentially of an aqueous emulsion having 40 to 60% by weight solids and a pH in the range of about 4 to 6, of a silanol-terminated polydiorganosiloxane having a molecular weight of about $5 \times 10^3$ to about $15 \times 10^3$, and an effective amount of a nonionic surfactant,
(B) 0.1 to 5 parts and preferably 0.5 to 1.5 part of a silane cross-linker,
(C) 25 to 70 parts of calcium carbonate, and
(D) 0.3 to 2 parts and preferably 0.4 to 1.5 part of a stannoxane catalyst.

The aqueous emulsion of the silanol-terminated polydiorganosiloxane are preferably made by agitating a linear silanol-terminated polydiorganosiloxane in an aqueous media in the presence of 1% to 5% by weight of total emulsion of a nonionic surfactant. The pH of the emulsion can be adjusted to 4 to 6 by adding a carboxylic acid such as succinic acid.

The silanol-terminated polydiorganosiloxanes which can be used in the practice of the present invention have organo radicals attached to silicon which are selected from $C_{(1-13)}$, monovalent hydrocarbon radicals, and $C_{(1-13)}$ monovalent hydrocarbon radicals substituted with radicals inert during equilibration. Some of the organo radicals are, for example, $C_{(1-8)}$ alkyl radicals such as methyl, ethyl, propyl, butyl, pentyl, hexyl; haloalkyl radicals such as trifluoropropyl; and cyanoalkyl radicals such as cyanoethyl and cyanopropyl. In addition, the organo radicals attached to silicon can be selected from alkenyl radicals such as vinyl radicals; allyl radicals; alkylaryl radicals such as ethyl, phenyl; and arylalkyl radicals such as tolyl, xylyl, etc. The monovalent organo radicals also can be aryl radicals such as phenyl, halophenyl such as chlorophenyl, bromophenyl, naphthyl radicals, anthryl radicals, etc.

Silanol-terminated polydiorganosiloxanes useful in the practice of the invention are shown by W. Noll, "Chemistry and Technology of Silicones", Academic Press, New York (1968) p. 240. They can be prepared by the polymerization of cyclic siloxanes, such as octamethyltetracyclosiloxanes, using acidic or basic catalysts. These silanolorganosiloxanes can be emulsified in water with nonionic emulsifying agents, such as alkylaryloxypoly(etheneoxy)ethanol. Useful nonionic emulsifying agents are the nonionic surfactant which can be used in the practice of the invention are, for example, saponins, condensation products of fatty acids with ethyleneoxide such as dodecylether of tetraethyleneoxide, and condensation products of ethyleneoxide with sorbitan trioleate.

Acidic colloidal silica also can be used in the practice of the invention in the silicone caulking composition which can be present at from 1 to 10 percent based on total weight of composition.

There is also utilized in the caulking composition of the present invention, a trialkoxyorganosilane cross-linker, such as methyltrimethoxysilane, to effect a satisfactory cure in the resulting elastomer. Additional trialkoxyorganosiloxanes are, for example, methyltriethoxysilane, ethyltriethoxysilane, and methyltripropoxysilane.

The caulk compositions of the present invention have been found to have optimum shelf stability when there is employed from about 0.3% to 0.6% by weight of stannoxane of formula (1). Stannoxanes of formula (1) and method for making are shown by U.S. Pat. No. 3,664,997. Preferably, the stannoxanes of formula (1) include compounds such as $(C_4H_7)_2SnCl\text{-}O\text{-}(C_4H_7)_2SnOH$, and

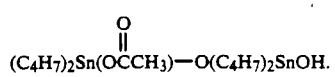

Other tin compounds which can be used are, for example,

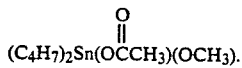

EXAMPLE

A base emulsion is prepared by passing through a Gaulin homogenizer a mixture of about 5000 grams of a silanol-terminated polydimethylsilxoane, about 5000 grams of water and about 200 grams of polyethylene glycol ether. The pH of the resulting mixture is adjusted by adding up to 200 grams of succinic acid. There is obtained a base formulation having about 60% solids and a pH of 4–5 of a silanol-terminated polydimethylsiloxane having an MW of about 10,000.

A mixture of 1500 g of the above base formulation is blended with 900 grams of ground calcium carbonate in a Ross double planetary mixer for 30–60 minutes, degassed, passed through a high shear Semco mixer for 15 minutes, and dispensed into anaerobic cartridges.

The above cartridges containing the base mixture are then catalyzed by injecting them with methyltrimethoxysilane, and in certain cases, acidic colloidal silica, along with toluene, and a tin curing catalyst. The following curable mixtures are prepared, which are shown in grams based on 100 parts of the base mixture, where "MTMS" is methyltrimethoxysilane, "bu" is butyl, and "Laur" is

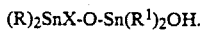

|  | 1 | 2 | 3 | 4 | 5 | 6 |
|---|---|---|---|---|---|---|
| MTMS | 0.5 | 0.5 | 0.5 | 0.5 | 0.5 | 0.5 |
| toluene | — | — | — | — | 1.0 | 1.0 |
| colloidal silica | — | 3.0 | — | — | 3.0 | — |
| bu$_2$Sn(OLaur)$_2$ | 0.33 | — | — | — | — | — |
| bu$_2$Sn(OMe))Laur) | — | 0.5 | 0.5 | — | — | — |
| [bu$_2$Sn(OLaur)$_2$O | — | — | — | 0.5 | — | — |
| bu$_2$SnCl—O—Snbu$_2$OH | — | — | — | — | 0.5 | 0.5 |

The materials are thoroughly mixed using a Semkit mixer. The materials are then cured for one week prior to tensile property measurement. Tensile properties are measured according to ASTM Standard D412 and the following results are obtained, where Shore A is hardness, and TS is tensile strength:

|  | 1 | 2 | 3 | 4 | 5 | 6 |
|---|---|---|---|---|---|---|
| Shore A | 19(25)* | 25(28)* | 17(12)** | 22(21)*** | 14(16) | 15(12)* |
| TS (psi) | 93(76) | 178(166) | 130(108) | 148(118) | 162(181) | 159(187) |
| Strain (%) | 398(219) | 551(527) | 638(625) | 513(501) | 695(682) | 656(694) |

*Numbers in parentheses refer to properties obtained from materials aged in the tube for two weeks and a one week cure period.
**Numbers in parentheses refer to properties obtained from materials aged in the tube for one month and one week cure period.
***Numbers in parentheses refer to properties obtained from materials aged in the tube for two months and one week cure period.

The above results show that the stannoxanes are valuable condensation catalysts and materials formulated with these catalysts maintain their elongation upon aging.

Although the above results are directed to only a few of the very many variables which can be used in the practice of the present invention, it should be understood that the present invention is directed to a much broader variety of caulk compositions utilizing stannoxanes, silanol-terminated polydiorganosiloxanes, cross-linking silanes, as shown in the description preceding these examples.

What is claimed and sought to be protected by Letters Patent of the United States is as follows:

1. A silicone latex composition consisting essentially of by weight,
   (A) 100 parts of a base formulation consisting essentially of an aqueous emulsion having 40 to 60% by weight solids and a pH in the range of about 4 to 6, of a silanol-terminated polydiorganosiloxane and an effective amount of a nonionic surfactant,
   (B) 0.1 to 5 parts of a silane cross-linker,
   (C) 25 to 70 parts of calcium carbonate, and
   (D) 0.3 to 2 parts of a stannoxane catalyst having the formula, $$(R)_2SnX\text{-}O\text{-}Sn(R^1)_2OH.$$

where R and R$^1$ are selected from the same or different C$_{(1\text{-}8)}$ alkyl radicals, and X is a halogen radical, or an acyloxy radical.

2. A caulk composition in accordance with claim 1, wherein the polydiorganosiloxane is a silanol-terminated polydimethylsiloxane.

3. A caulk composition in accordance with claim 1, wherein the stannoxane is

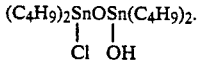

4. A caulk composition in accordance with claim 1, where the silane cross-linker is methyltrimethoxysilane.

* * * * *